(12) United States Patent
Chun et al.

(10) Patent No.: US 10,531,214 B2
(45) Date of Patent: Jan. 7, 2020

(54) DEVICE AND METHOD FOR CONTROLLING MICROPHONE ACCORDING TO CONNECTION OF EXTERNAL ACCESSORY

(71) Applicant: Samsung Electronics Co., Ltd., Suwon-si, Gyeonggi-do (KR)

(72) Inventors: Young Soo Chun, Yongin-si (KR); Jung Sik Park, Suwon-si (KR); Seung Won Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/189,961

(22) Filed: Nov. 13, 2018

(65) Prior Publication Data

US 2019/0149933 A1    May 16, 2019

(30) Foreign Application Priority Data

Nov. 13, 2017   (KR) ........................ 10-2017-0150665

(51) Int. Cl.
*H04R 1/10*       (2006.01)
*H04R 29/00*      (2006.01)
(Continued)

(52) U.S. Cl.
CPC ......... *H04R 29/004* (2013.01); *G06F 3/0484* (2013.01); *H04R 1/1041* (2013.01);
(Continued)

(58) Field of Classification Search
CPC ...... H04R 29/004; H04R 3/00; H04R 1/1041; H04R 5/04; H04R 2420/05; H04R 2420/09; G06F 3/0484; H04N 5/23203
(Continued)

(56) References Cited

U.S. PATENT DOCUMENTS 8,548,175 B2   10/2013   Im et al.
9,031,253 B2    5/2015   Shah et al.
(Continued)

FOREIGN PATENT DOCUMENTS

JP    2015507868 A    3/2015
KR   10-1568176 B1   11/2015
(Continued)

OTHER PUBLICATIONS

ISA/KR, "International Search Report," Application No. PCT/KR2018/013796, dated Feb. 18, 2019, 4 pages.

*Primary Examiner* — Paul Kim
*Assistant Examiner* — Con P Tran

(57) ABSTRACT

Disclosed are an electronic device and a method for controlling the same, where the electronic device that includes an earphone connector including first and second contacts associated with a sound output through an audio plug, a third contact connected to a ground terminal, and a fourth contact associated with a sound input, and a microphone. The method includes applying a bias voltage to the fourth contact, measuring a voltage between the third and fourth contacts, measuring an impedance between at least one of the first or second contact and the third contact, activating the microphone when the measured voltage is greater than or equal to a first threshold value and the measured impedance is less than or equal to a second threshold value, and deactivating the microphone when the measured voltage is greater than or equal to the first threshold value and the measured impedance exceeds the second threshold value.

20 Claims, 7 Drawing Sheets

(51) Int. Cl.
  *G06F 3/0484* (2013.01)
  *H04R 3/00* (2006.01)
(52) U.S. Cl.
  CPC ........... *H04R 3/00* (2013.01); *H04R 2420/05* (2013.01); *H04R 2420/09* (2013.01)
(58) Field of Classification Search
  USPC ............... 381/58, 56, 122, 91, 394, 74, 384; 439/668, 669; 307/112, 85, 86; 348/220.1; 396/312
  See application file for complete search history.

(56) References Cited

U.S. PATENT DOCUMENTS

| | | | |
|---|---|---|---|
| 9,294,857 B2 | 3/2016 | Prentice | |
| 9,432,786 B2 | 8/2016 | Prentice et al. | |
| 9,497,559 B2 | 11/2016 | Prentice | |
| 9,591,421 B2 | 3/2017 | Prentice et al. | |
| 9,609,447 B2 | 3/2017 | Miske et al. | |
| 2009/0179768 A1* | 7/2009 | Sander | H04M 1/05 340/13.27 |
| 2010/0303251 A1* | 12/2010 | Im | H04R 1/1041 381/74 |
| 2013/0020882 A1 | 1/2013 | Prentice | |
| 2013/0021041 A1 | 1/2013 | Prentice | |
| 2013/0021046 A1 | 1/2013 | Prentice et al. | |
| 2013/0034242 A1 | 2/2013 | Prentice et al. | |
| 2013/0156216 A1 | 6/2013 | Shah et al. | |
| 2013/0158919 A1 | 6/2013 | Shah et al. | |
| 2014/0354839 A1* | 12/2014 | Yu | H04N 5/23203 348/211.99 |
| 2015/0078577 A1* | 3/2015 | Cimaz | H04R 29/001 381/74 |
| 2015/0326970 A1 | 11/2015 | Miske et al. | |
| 2016/0252799 A1* | 9/2016 | Li | F16M 11/28 396/425 |
| 2016/0309251 A1* | 10/2016 | Poulsen | H04R 1/08 |
| 2016/0373861 A1* | 12/2016 | Poulsen | H01R 24/58 |
| 2017/0064479 A1 | 3/2017 | Prentice | |
| 2017/0280244 A1 | 9/2017 | Scarlett et al. | |

FOREIGN PATENT DOCUMENTS

| | | |
|---|---|---|
| KR | 10-2016-0118603 A | 10/2016 |
| KR | 10-2016-0123744 A | 10/2016 |

* cited by examiner

DEVICE AND METHOD FOR CONTROLLING MICROPHONE ACCORDING TO CONNECTION OF EXTERNAL ACCESSORY

CROSS-REFERENCE TO RELATED APPLICATION

This application is based on and claims priority under 35 U.S.C. § 119 to Korean Patent Application No. 10-2017-0150665, filed on Nov. 13, 2017, in the Korean Intellectual Property Office, the disclosure of which is incorporated by reference herein its entirety.

BACKGROUND

1. Field

The present disclosure relates to a technology for controlling a microphone in accordance with the connection of an earphone connector and an external accessory.

2. Description of Related Art

In general, a monopod is a camera support in the shape of a single leg. The monopod may support a portable terminal and may be used for self-photographing using a portable terminal by adjusting a length thereof As an example, a monopod may include an audio plug inserted into an earphone connector of a portable terminal, and an input button. The monopod may generate an input signal in the portable terminal through the audio plug in accordance with a user input generated by pushing the input button. When a signal is generated while the portable terminal is executing a camera application, the portable terminal may perform an operation of capturing an image through the camera in response to the signal generated.

The above information is presented as background information only to assist with an understanding of the present disclosure. No determination has been made, and no assertion is made, as to whether any of the above might be applicable as prior art with regard to the present disclosure.

SUMMARY

An accessory, such as a monopod, may generate an input signal in a portable terminal through a quadrupole audio plug. For example, when a quadrupole audio plug of a monopod is inserted into an earphone connector of an electronic device, the electronic device may recognize that a quadrupole earphone including a microphone is connected and may operate in a mode where the electronic device obtains a sound signal through the earphone connector. In an embodiment, when the audio plug of the monopod is connected, a microphone of the electronic device is deactivated even if a monopod that does not include a microphone is connected.

Aspects of the present disclosure are to address at least the above-mentioned problems and/or disadvantages and to provide at least the advantages described below. Accordingly, an aspect of the present disclosure is to provide an electronic device capable of recognizing an external accessory connected through an earphone connector based on electrical characteristics of the external accessory, and activating or deactivating a microphone.

In accordance with an aspect of the present disclosure, an electronic device includes a housing including an opening in a portion thereof, at least one microphone arranged in the housing and exposed through the portion, an earphone connector receiving an audio plug through the opening and including a first contact and a second contact associated with a sound output through the audio plug, a third contact connected to a ground terminal, and a fourth contact associated with a sound input through the audio plug, an audio circuit electrically connected to the earphone connector, a processor electrically connected to the at least one microphone and the audio circuit, and a memory electrically connected to the processor, wherein the memory stores instructions that instruct, when executed, the processor to apply a bias voltage to the fourth contact through the audio circuit, measure a voltage between the third and fourth contacts through the audio circuit, measure an impedance between at least one of the first or second contact and the third contact through the audio circuit, activate the at least one microphone when the measured voltage is greater than or equal to a first threshold value and the measured impedance is less than or equal to a second threshold value, and deactivate the at least one microphone when the measured voltage is greater than or equal to the first threshold value and the measured impedance exceeds the second threshold value.

In accordance with another aspect of the present disclosure, a method of operating an electronic device, which includes an earphone connector including a first contact and a second contact associated with a sound output through an audio plug, a third contact connected to a ground terminal, and a fourth contact associated with a sound input, and a microphone, includes applying a bias voltage to the fourth contact, measuring a voltage between the third and fourth contacts, measuring an impedance between at least one of the first or second contact and the third contact, activating the microphone when the measured voltage is greater than or equal to a first threshold value and the measured impedance is less than or equal to a second threshold value, and deactivating the microphone when the measured voltage is greater than or equal to the first threshold value and the measured impedance exceeds the second threshold value.

In accordance with another aspect of the present disclosure, an electronic device includes a housing including an opening in a portion thereof, at least one microphone exposed through a second portion of the housing, a port receiving, through the opening, an adaptor including a connector and an earphone connector, wherein the port includes a first terminal connected to a first contact of the earphone connector through the connector, a second terminal connected to a second contact of the earphone connector, a third terminal connected to a third contact of the earphone connector, and a fourth terminal connected to a fourth contact of the earphone connector, an audio circuit electrically connected to the port, a processor electrically connected to the at least one microphone and the audio circuit, and a memory electrically connected to the processor, wherein the memory stores instructions that instruct, when executed, the processor to apply a bias voltage to the fourth terminal through the audio circuit, measure a voltage between the third and fourth terminals through the audio circuit, measure an impedance between at least one of the first or second terminal and the third terminal through the audio circuit, obtain a sound through the microphone when the measured voltage is greater than or equal to a first threshold value and the measured impedance is less than or equal to a second threshold value, and deactivate the microphone when the measured voltage is greater than or equal to the first threshold value and the measured impedance exceeds the second threshold value.

According to various embodiments, the electronic device may recognize an external accessory connected thereto.

According to various embodiments, the electronic device may recognize whether an external accessory is an ear-set including a microphone and an earphone, and may activate or deactivate the microphone of the electronic device according to the connected external accessory.

According to various embodiments, when an input is received through the input button of an external accessory, different operations may be performed depending on the type of connected external accessory.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, similar components may be assigned with similar reference numerals.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

Figure 1:
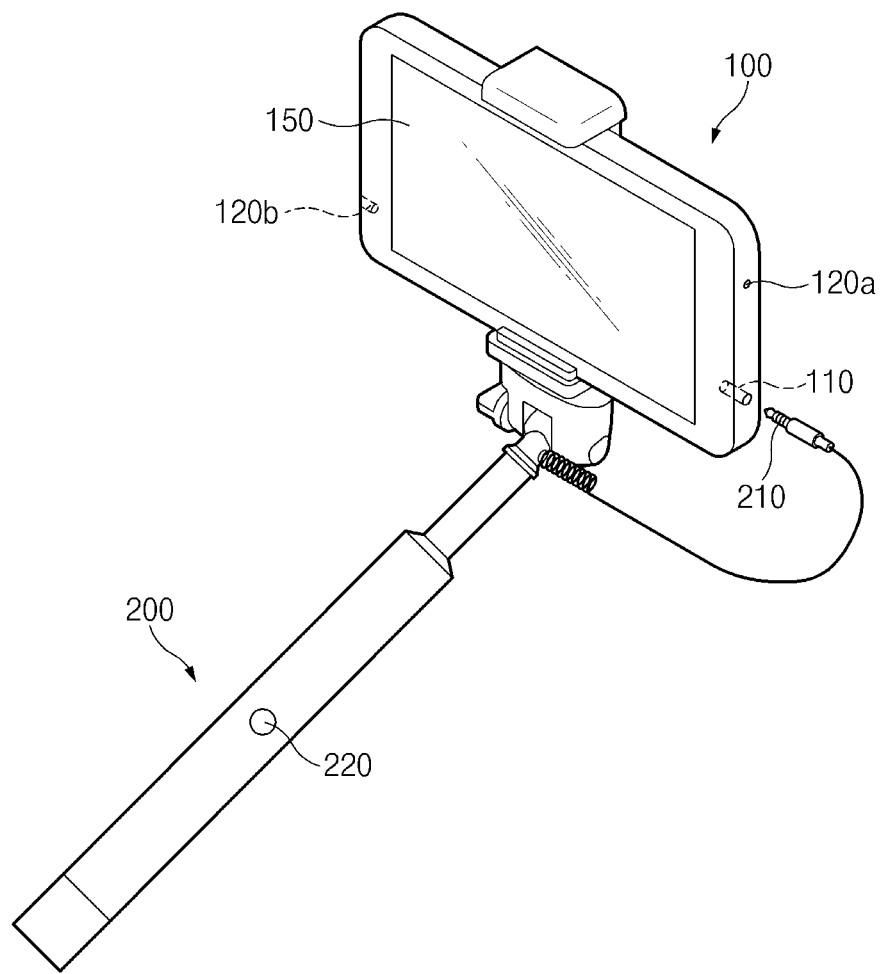
FIG. 1 is a view illustrating an electronic device mounted on a monopod according to an embodiment.
Figure 2:
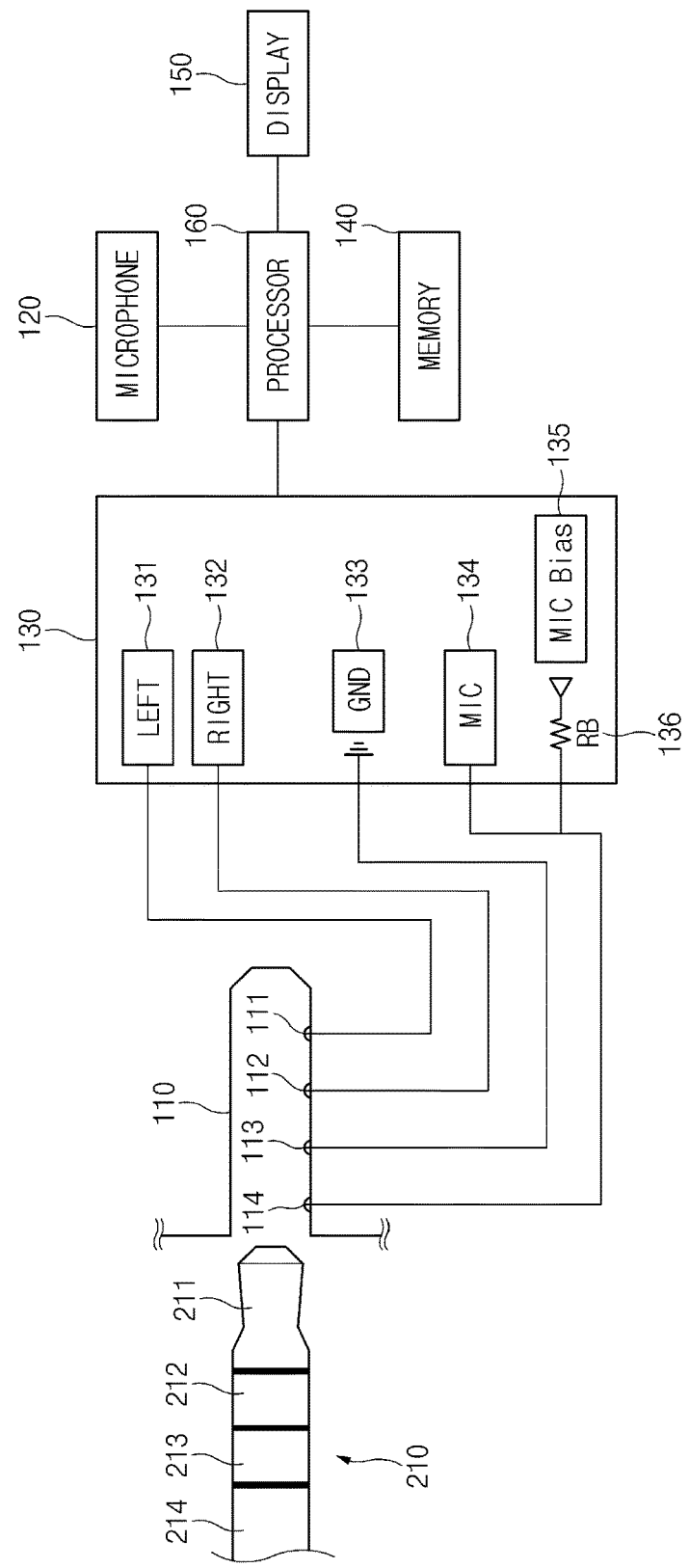
FIG. 2 is a view illustrating a connection of an earphone connector and an audio circuit of an electronic device according to an embodiment.

FIG. 1 is a view illustrating an electronic device mounted on a monopod according to an embodiment. FIG. 2 is a view illustrating a connection of an earphone connector and an audio circuit of an electronic device according to an embodiment.

Referring to FIGS. 1 and 2, an electronic device 100 may include an earphone connector 110, at least one main microphone 120, an audio circuit 130, a memory 140, a display 150, and a processor 160. According to an embodiment, some components (e.g., the display 150) may be omitted from the electronic device 100. According to an embodiment, although not shown in FIGS. 1 and 2, the electronic device 100 may further include a camera.

The earphone connector 110 may receive an audio plug 210 through an opening included in a portion of a housing of the electronic device 100 and may electrically connect the received audio plug 210 and the audio circuit 130 to each other. According to an embodiment, the earphone connector 110 may include first to fourth contacts 111 to 114. According to an embodiment, each of the plurality of contacts 111 to 114 may contact each of a plurality of poles 211 to 214 included in the received audio plug 210. For example, the first contact 111 may contact the first pole 211 associated with a left earphone (or speaker) of the audio plug 210 and the second contact 112 may contact the second pole 212 associated with a right earphone of the audio plug 210. The third contact 113 may contact the third pole 213 associated with the ground of the audio plug 210 and the fourth contact 114 may contact the fourth pole 214 associated with the main microphone 120 of the audio plug 210.

The at least one main microphone 120 may be arranged in the housing of the electronic device 100 and may be exposed through a portion of the housing. According to an embodiment, the electronic device 100 may include a plurality of main microphones 120a and 120b, and the plurality of main microphones 120a and 120b may be exposed through mutually different portions of the housing.

The audio circuit 130 may be arranged in the housing of the electronic device 100 and may be electrically connected to the earphone connector 110. The audio circuit 130 may include a left audio output unit 131, a right audio output unit 132, a ground terminal 133, a microphone unit 134, a bias voltage applying unit 135, a bias resistor 136, and the like.

According to an embodiment, the left audio output unit 131 may be electrically connected to the first contact 111 of the earphone connector 110 and the right audio output unit 132 may be electrically connected to the second contact 112 of the earphone connector 110. According to an embodiment, the left and right audio output units 131 and 132 may output corresponding audio signals to the audio plug 210 through the first and second contacts 111 and 112, respectively.

According to an embodiment, the ground terminal 133 may be electrically connected to the third contact 113 of the earphone connector 110 and the microphone unit 134 may be electrically connected to the fourth contact 114 of the earphone connector 110. According to an embodiment, the microphone unit 134 may provide an audio signal or a control signal obtained through the fourth contact 114 to the processor 160.

According to an embodiment, the bias voltage applying unit 135 may apply a bias voltage (e.g., 2.8 V) to the fourth contact 114. According to an embodiment, the bias resistor 136 may be arranged between the bias voltage applying unit 135 and the fourth contact 114.

According to an embodiment, although not shown in FIGS. 1 and 2, the audio circuit 130 may include a voltage measurement module for measuring a voltage between the third and fourth contacts 113 and 114, and an impedance measurement module for measuring an impedance between at least one of the first or second contact 111 or 112 and the third contact 113.

According to an embodiment, the voltage measurement module may measure the voltage between the third and fourth contacts 113 and 114 with the bias voltage applied. According to an embodiment, the measured voltage may be related to the resistance of an ear microphone of an external accessory (e.g., an ear-set) connected to the audio plug 210. According to an embodiment, the larger the resistance value of the ear microphone of the external accessory is, the larger the measured voltage value between the third and fourth contacts 113 and 114 may be. For example, the greater the impedance between the pole associated with the ear microphone of the audio plug 210 and the pole associated with the ground is, the greater the measured voltage may be. In an embodiment, the applied bias voltage may be 2.8 V and the bias resistor 136 may be 2.2 kΩ. According to an embodiment, when the connected external accessory is a quadrupole earphone, the measured voltage may be 2.1 V. According to an embodiment, when the connected external accessory is a 3-pole earphone, the measured voltage may be 0V.

According to an embodiment, the impedance between the first and third contacts 111 and 113 measured by the impedance measurement module may correspond to the impedance of the left earphone connected to the audio plug 210. According to an embodiment, the impedance between the second and third contacts 112 and 113 measured by the impedance measurement module may correspond to the impedance of the right earphone connected to the audio plug 210. For example, the measured impedance may be 16Ω, 32Ω, or the like.

According to an embodiment, the impedance measurement module may output a test signal and may measure the impedance using the measured current value. According to an embodiment, the impedance measurement module may apply a voltage to at least one of the first or second contact 111 or 112 and measure the voltage between at least one of the first or second contact 111 or 112 and the third contact 113, thereby measuring the impedance.

The memory 140 is electrically coupled to the processor 160 and may store instructions that are executed by the processor 160. According to an embodiment, the memory 140 may store the specified sensitivity of the main microphone 120. According to an embodiment, the memory 140 may store an application (e.g., a camera application) that is executed by processor 160.

The display 150 may output an execution image of an application, or the like. In an embodiment, the display 150 may be implemented with a touch panel (e.g., a touch screen display or the like).

The processor 160 may execute the instructions stored in the memory 140 to perform operations described below.

According to an embodiment, the processor 160 may control the audio circuit 130 to measure the voltage between the third and fourth contacts 113 and 114. According to an embodiment, the processor 160 may control the audio circuit 130 to measure the impedance between at least one of the first or second contact 111 or 112 and the third contact 113.

According to an embodiment, the processor 160 may change the sensitivity of the main microphone 120 to a value in a specified range. For example, the processor 160 may set the sensitivity of the main microphone 120 to a value higher than the specified sensitivity.

According to an embodiment, the processor 160 may activate or deactivate at least one main microphone 120. When the electronic device 100 includes the plurality of main microphones 120 according to an embodiment, the processor 160 may activate some of the plurality of main microphones 120, and may deactivate the remaining main microphones 120.

According to an embodiment, the processor 160 may display, on the display 150, information relating to obtaining sound through the main microphone 120. For example, the processor 160 may display a message microphone icon or a microphone image 'Voice is input to the microphone of the mobile phone' on the display 150.

According to an embodiment, the processor 160 may perform a specified operation when a previously specified event occurs. For example, the processor 160 may acquire an image through the camera of the electronic device 100 when a previously specified event occurs.

According to an embodiment, the processor 160 may perform a specified operation when a previously specified event occurs at a specified number of times within a specified range of time. For example, when a previously specified event occurs twice for one second, the processor 160 may execute the camera application.

According to an embodiment, a monopod 200 may include the audio plug 210, an input button 220, and the like.

The audio plug 210 may be inserted into the earphone connector 110 of the electronic device 100. According to an embodiment, the audio plug 210 may include a plurality of poles insulated from each other. For example, the audio plug 210 may include the first pole 211 associated with the left earphone (or a speaker), the second pole 212 associated with the right earphone, the third pole 213 associated with the ground, and the fourth pole 214 associated with the main microphone 120.

According to an embodiment, when the audio plug 210 is inserted into the earphone connector 110, the first pole 211 may contact the first contact 111, the second pole 212 may contact the second contact 112, the third pole 213 may contact the third contact 113, and the fourth pole 214 may contact the fourth contact 114.

Figure 3:
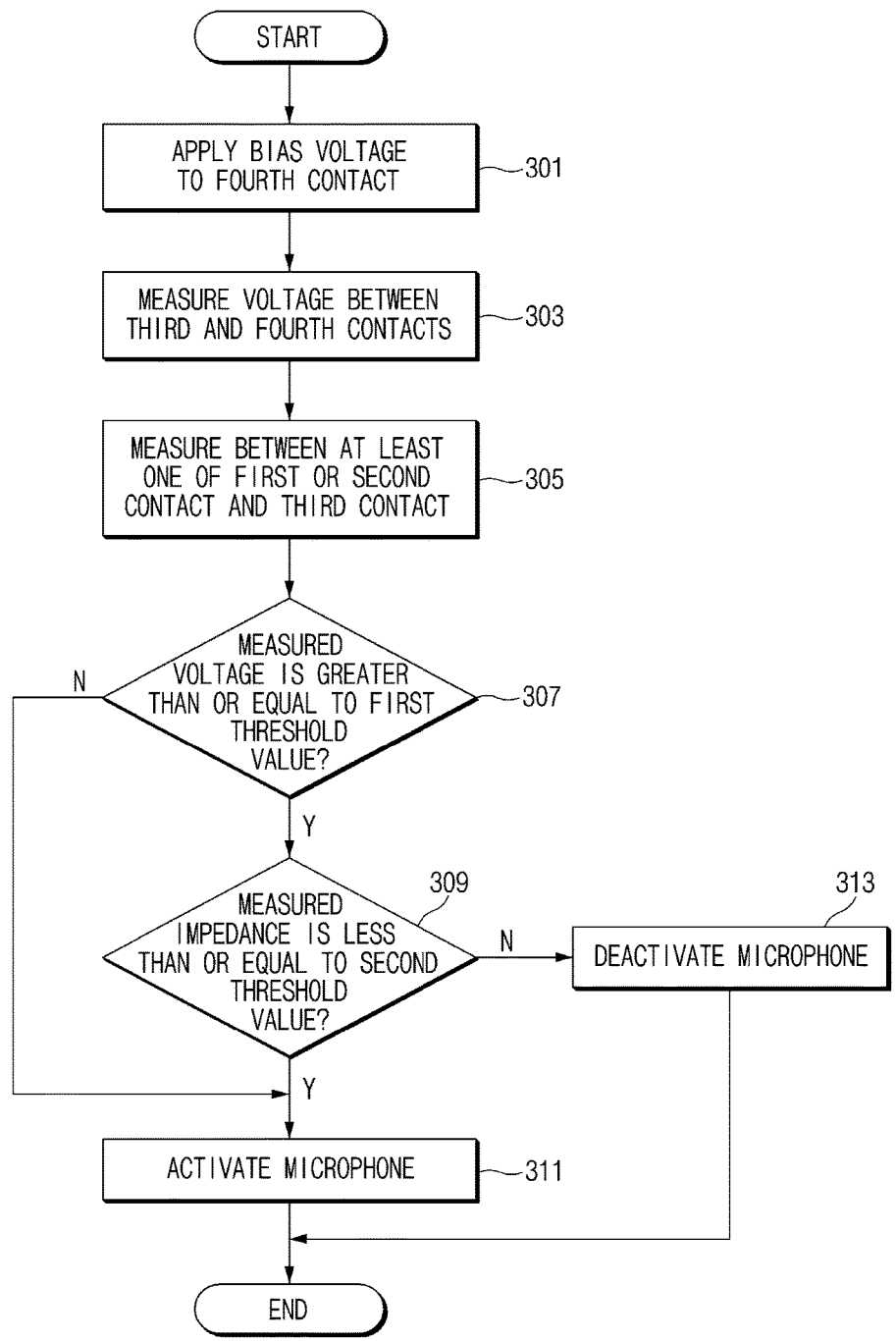
FIG. 3 is a flowchart illustrating a method of operating the electronic device according to an embodiment.

The input button 220 is input means for generating a signal. According to an embodiment, when the input button 220 is pushed, the impedance between the third and fourth poles 213 and 214 may be changed. The signal by the input button 220 may be generated as the impedance is changed FIG. 3 is a flowchart illustrating a method of operating the electronic device 100 according to an embodiment.

Hereinafter, it is assumed that the electronic device 100 of FIG. 2 performs the process of FIG. 3. In addition, in the description of FIG. 3, it may be understood that the operations described as being performed by the electronic device 100 are controlled by the processor 160 of the electronic device 100. The operations described as being performed by the electronic device 100 may be implemented with instructions that may be performed (or executed) by the processor 160 of the electronic device 100. For example, the instructions may be stored in a computer recording medium or in the memory 140 of the electronic device 100 shown in FIG. 2.

According to an embodiment, before operation 301, the processor 160 may determine whether the audio plug 210 is received in the earphone connector 110. According to an embodiment, when the audio plug 210 is received in the earphone connector 110, the processor 160 may be configured to perform operation 301.

In operation 301, the processor 160 may apply the bias voltage to the fourth contact 114 through the audio circuit 130.

According to an embodiment, the fourth contact 114 may be a contact associated with sound input through the audio plug 210. According to an embodiment, the applied bias voltage may be 2.8 V.

In operation 303, the processor 160 may measure the voltage between the fourth and third contacts 114 and 113 through the audio circuit 130.

According to an embodiment, the third contact 113 may be a contact connected to the ground terminal. According to an embodiment, the greater the impedance between the third and fourth contacts 113 and 114 is, the greater the voltage measured may be.

In operation 305, the processor 160 may measure the impedance between the third contact 113 and at least one of the first or second contact 111 or 112 through the audio circuit 130.

According to an embodiment, the first and second contacts 111 and 112 may be contacts associated with sound output through the audio plug 210. According to an embodiment, the processor 160 may measure the impedance between the first or second contact 111 or 112 and third contact 113. According to an embodiment, the processor 160 may measure the impedance between the first and third contacts 111 and 113 and the impedance between the second and third contacts 112 and 113.

According to an embodiment, the impedance between the first and third contacts 111 and 113 may correspond to the impedance of the left earphone connected to the audio plug 210. According to an embodiment, the impedance between the second and third contacts 112 and 113 may correspond to the impedance of the right earphone connected to the audio plug 210.

According to an embodiment, the sequence of performing operations 303 and 305 may be changed. According to an embodiment, operations 303 and 305 may be performed concurrently.

According to an embodiment, when the measured voltage is equal to or greater than a first threshold value in operation 307 and the measured impedance is equal to or less than a second threshold value in operation 309, in operation 311, the processor 160 may obtain a sound through the main microphone 120 of the electronic device 100.

According to an embodiment, the first threshold value may be less than the voltage measured when the audio plug 210 of a conventional quadrupole earphone is inserted into the earphone connector 110, and may be greater than the voltage measured when the audio plug of a conventional three-pole earphone is inserted into earphone connector 110. According to an embodiment, the second threshold value may be less than the impedance of a conventional earphone or headphone (e.g., 16Ω or 32Ω).

According to an embodiment, even when a sound is obtained through the main microphone 120 of the electronic device 100, the bias voltage may be applied to the fourth contact 114 through the audio circuit 130.

According to an embodiment, when the measured voltage is equal to or greater than the first threshold value in operation 307 and the measured impedance exceeds the second threshold value in operation 309, in operation 313, the processor 160 may deactivate the main microphone 120 of the electronic device 100. According to an embodiment, when the audio plug 210 of the quadrupole earphone is inserted into the earphone connector 110, the measured voltage may be equal to or greater than the first threshold value and the measured impedance may exceed the second threshold value. In this case, the processor 160 may obtain a sound through an ear microphone which is the microphone of the connected quadrupole earphone.

According to an embodiment, when the measured voltage is less than the first threshold value in operation 307, in operation 311, the processor 160 may obtain a sound through the main microphone 120 of the electronic device 100. According to an embodiment, when the audio plug 210 of the three-pole earphone is inserted into the earphone connector 110, the measured voltage may be less than the first threshold value. According to an embodiment, since the three-pole earphone does not include the main microphone 120, the processor 160 may obtain a sound through the main microphone 120 of the electronic device 100.

Figure 4:
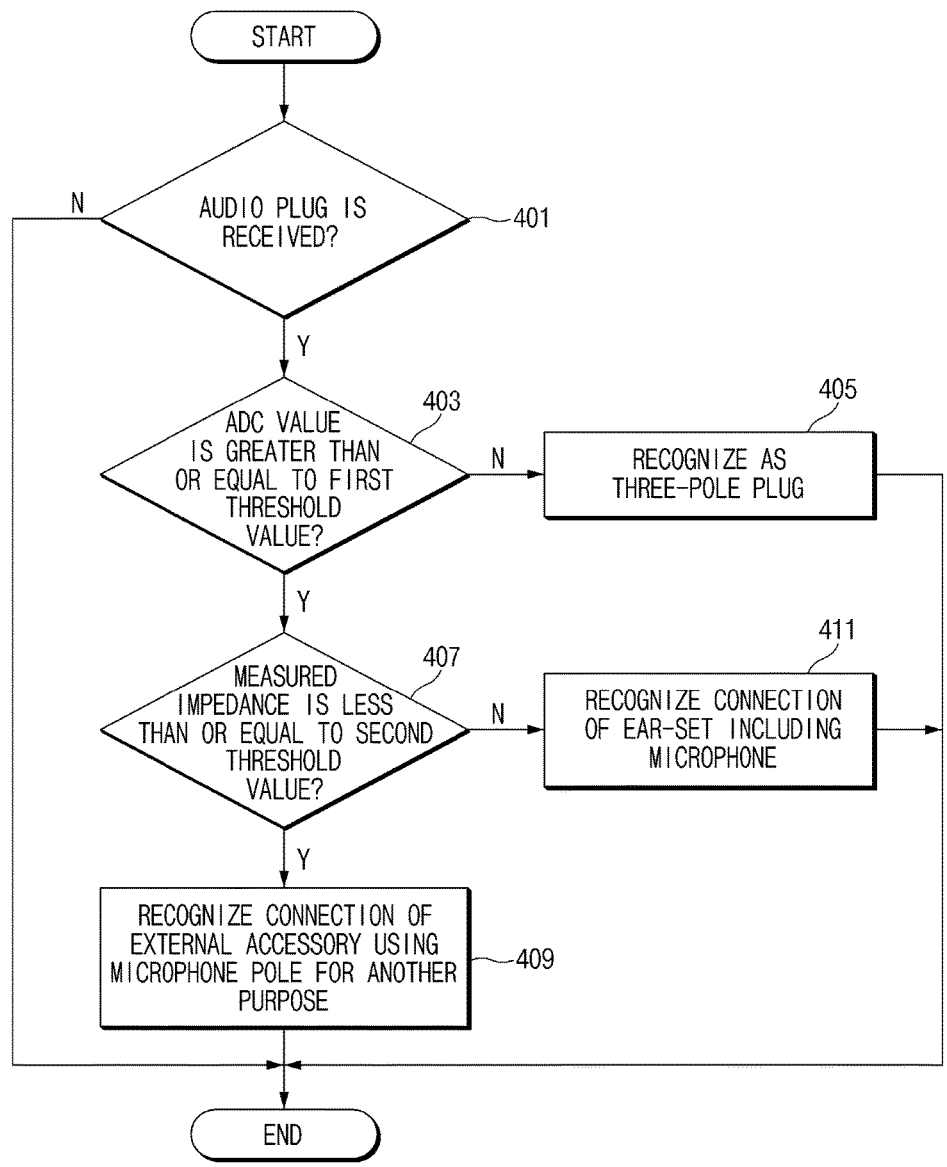
FIG. 4 is a flowchart illustrating a method of detecting connection of an external accessory according to an embodiment.

FIG. 4 is a flowchart illustrating a method of detecting connection of an external accessory according to an embodiment.

Hereinafter, it is assumed that the electronic device 100 of FIG. 2 performs the process of FIG. 4. In addition, in the description of FIG. 4, it may be understood that the operations described as being performed by the electronic device 100 are controlled by the processor 160 of the electronic device 100. The operations described as being performed by the electronic device 100 may be implemented with instructions that may be performed (or executed) by the processor 160 of the electronic device 100. For example, the instructions may be stored in a computer recording medium or in the memory 140 of the electronic device 100 shown in FIG. 2.

According to an embodiment, the operations shown in FIG. 4 may correspond to the operations described with reference to FIG. 3. For example, operation 401 may correspond to an operation of determining whether the audio plug 210 is received in the earphone connector 110 before operation 301 described above. According to an embodiment, operation 403 may correspond to operation 307, and operation 405 may correspond to operation 311 after operation 307. According to an embodiment, operation 407 may correspond to operation 309, and operation 411 may correspond to operation 313 after operation 309. According to an embodiment, operation 409 may correspond to operation 311 after operations 307 and 309.

In operation 401, the processor 160 may determine whether the audio plug 210 is received in the earphone connector 110. When the audio plug 210 is not received, the processor 160 may not perform any operations.

According to an embodiment, the earphone connector 110 may further include a fifth contact in contact with the third pole 213 of the audio plug 210. According to an embodiment, the audio circuit 130 may further include a ground terminal sensing unit, a voltage applying unit, and a bias resistor. According to an embodiment, the voltage applying unit may be connected in series with one end of the bias resistor, and the other end of the bias resistor may be connected to the fifth contact. The voltage applying unit may apply a voltage to the fifth contact through the bias resistor. The ground terminal sensing unit may measure the voltage between the other end of the bias resistor and the ground terminal.

According to an embodiment, the processor may determine that the audio plug 210 is received in the earphone connector 110 when the voltage measured through the ground terminal sensing unit drops from a first value to a second value specified or less.

According to an embodiment, when the audio plug 210 is received and a measured analog to digital converter (ADC) value is equal to or greater than the first threshold value in operation 403, in operation 405, the processor 160 may recognize the received audio plug 210 as the three-pole audio plug 210.

According to an embodiment, before operation 403, the processor 160 may apply the bias voltage to the fourth contact 114 through the audio circuit 130 and then measure the ADC value. According to an embodiment, the ADC value may be a voltage value measured between the third and fourth contacts 113 and 114.

According to an embodiment, when the ADC value is greater than or equal to the first threshold value and the measured impedance is less than or equal to the second threshold value, in operation 409, the processor 160 may recognize that an external accessory (e.g., a monopod including a wired remote controller, or the like) that uses the microphone pole of the audio plug for a purpose other than a microphone is connected to the earphone connector 110.

According to an embodiment, before operation 407, the processor 160 may measure the impedance between at least one of the first or second contact 111 or 112 and the third contact 113 through the audio circuit 130.

According to an embodiment, when the ADC value is greater than or equal to the first threshold value and the measured impedance exceeds the second threshold value, in operation 411, the processor 160 may recognize that an ear set including the main microphone 120 is connected to the earphone connector 110.

According to an embodiment, when the measured voltage is greater than or equal to the first threshold and the measured impedance is less than or equal to the second threshold value (or when it is recognized that the external accessory is connected), the processor 160 may further perform at least some of the operations described below. According to an embodiment, the processor 160 may increase the sensitivity of the specified main microphone 120. This is because when the electronic device 100 is used in a state where the electronic device 100 is mounted on a mono pod, the electronic device is far away from the vocal point of a user. According to an embodiment, when the electronic device 100 includes the plurality of main microphones 120, the processor 160 may obtain a sound through at least one main microphone 120 previously specified among the plurality of main microphones 120 and may deactivate the remaining main microphones 120.

According to an embodiment, the processor 160 may display, on the display 150, information related to obtaining the sound through the main microphone 120.

Figure 5:
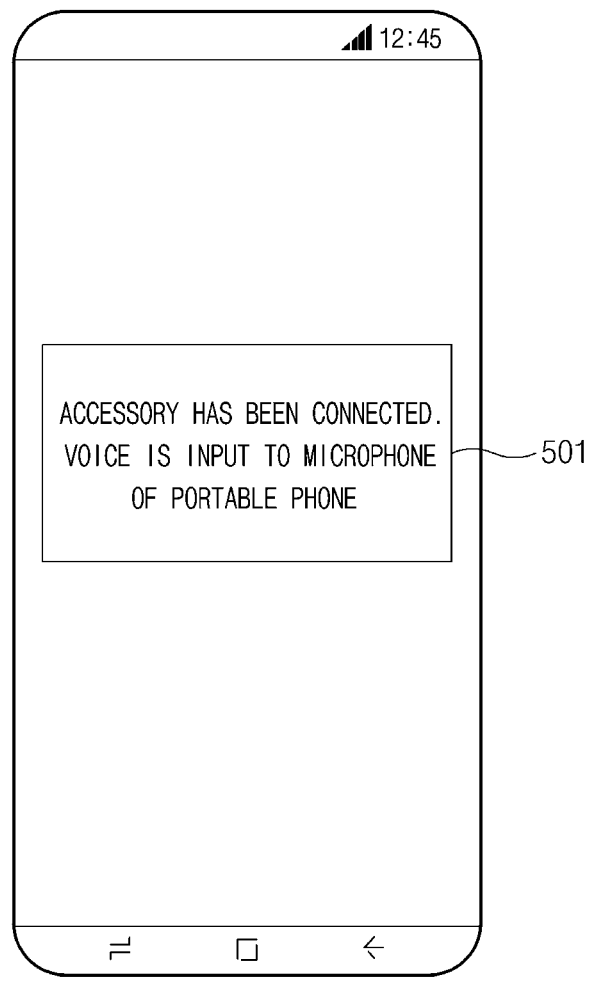
FIG. 5 is a view illustrating an image output to the display when an external accessory is connected according to an embodiment.

FIG. 5 is a view illustrating an image output to the display 150 when an external accessory is connected according to an embodiment.

According to an embodiment, as illustrated in FIG. 5, the processor 160 may display, on the display 150, a message 501 representing that a sound is obtained through the main microphone 120 and an accessory is connected.

According to an embodiment, in a state where the measured voltage is less than the first threshold value or the measured impedance exceeds the second threshold value, when a first event occurs in which the measured voltage is changed to a specified first voltage, a first operation specified may be performed. According to an embodiment, in a state where the measured voltage is greater than or equal to the first threshold value and the measured impedance is less than or equal to the second threshold value, when a second event occurs in which the measured voltage is changed to a second voltage specified, a second operation different from the first operation may be performed. According to an embodiment, the first and second voltages may be the same as or different from each other.

For example, when the audio plug 210 of the quadrupole earphone is inserted into the earphone connector 110, the measured impedance may exceed the second threshold value. In an embodiment, in a state where the measured voltage is 2.1 V, when an event occurs in which the input button 220 of the quadrupole earphone is pushed and the measured voltage is changed to 1 V, the processor 160 may perform a specified operation of reproducing music. According to an embodiment, when the audio plug 210 of the monopod 200 is inserted into the earphone connector 110, the measured voltage may be greater than or equal to the first threshold value and the measured impedance may be less than or equal to the second threshold value. In an embodiment, in a state where the measured voltage is 2.1 V, when an event occurs in which the input button 220 of the monopod 200 is pushed and the measured voltage is changed to 1 V, the processor 160 may perform an operation of obtaining an image through the camera.

According to an embodiment, in a state where the measured voltage is less than the first threshold value or the measured impedance exceeds the second threshold value, when a first event, in which the measured voltage is changed to the first voltage previously specified, occurs a number of times in a specified range within a specified range of time, the processor 160 may perform the first operation. According to an embodiment, in a state where the measured voltage is greater than the first threshold value and the measured impedance is less than or equal to the second threshold value, when a second event, in which the measured voltage is changed to the second voltage previously specified, occurs a number of times in a specified range within a specified range of time, the processor 160 may perform the second operation.

For example, when the audio plug 210 of the quadrupole earphone is inserted into the earphone connector 110, the measured impedance may exceed the second threshold value. In an embodiment, in a state where the measured voltage is 2.1 V, when an event, in which the input button 220 of the quadrupole earphone is pushed twice in succession and the measured voltage is changed to 1 V, occurs twice within one second, the processor 160 may execute a music application. In an embodiment, when the audio plug 210 of the monopod 200 is inserted into the earphone connector 110, the measured voltage may be greater than or equal to the first threshold and the measured impedance may less than or equal to the second threshold value. In an embodiment, in a state where the measured voltage is 2.1 V, when an event, in which the input button 220 of the monopod 200 is pushed twice in succession and the measured voltage is changed to 1 V, occurs twice within one second, the processor 160 may execute a camera application.

Figure 6:
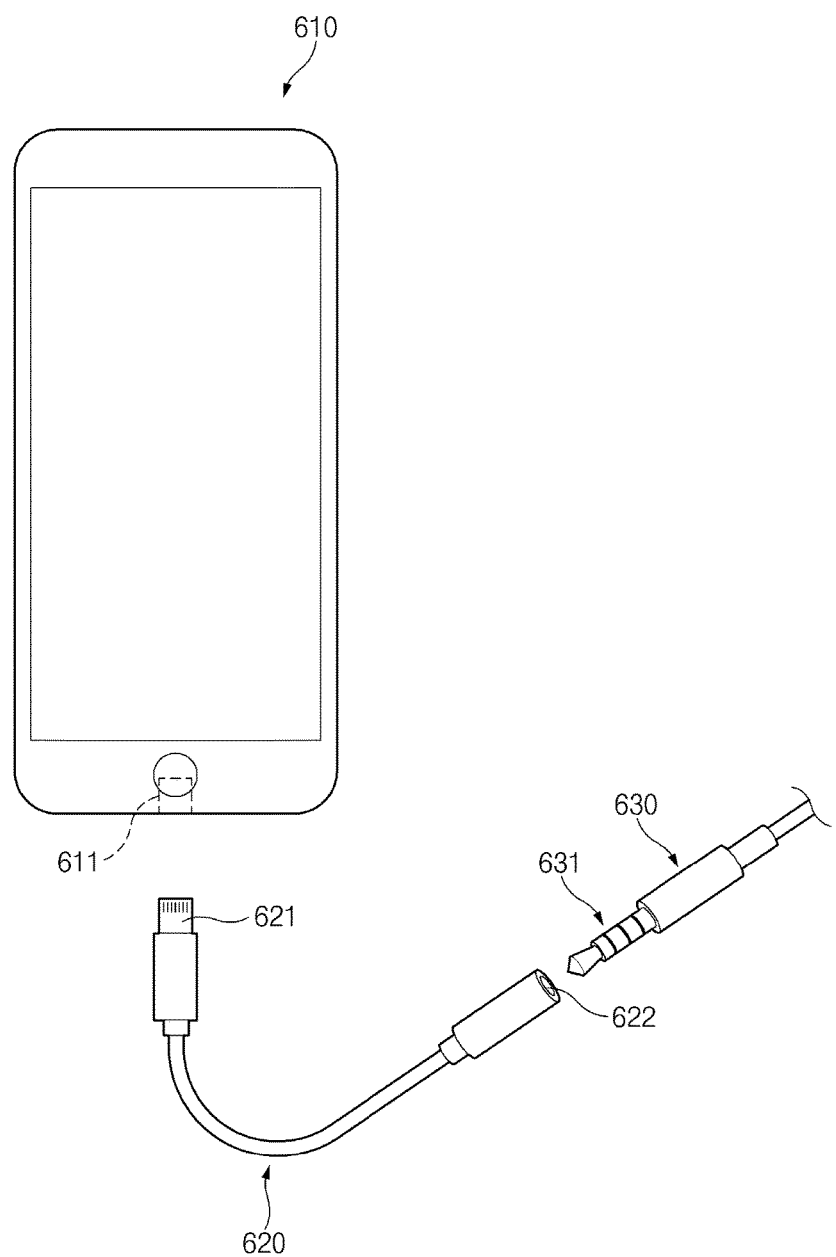
FIG. 6 is a view illustrating an electronic device, an adapter, and an audio plug according to an embodiment.

FIG. 6 is a view illustrating an electronic device, an adapter, and an audio plug according to an embodiment.

According to an embodiment, as illustrated in FIG. 6, an electronic device 600 includes the components of the electronic device 100 described with reference to FIGS. 1 and 2, and may further include a port 611 that substitutes for the earphone connector 110. According to an embodiment, the electronic device 600 may include the port 611 in addition to the earphone connector.

According to an embodiment, the port 611 may receive an adapter through an opening included in a portion of a housing of the electronic device 600. According to an embodiment, the port 611 may be electrically connected to an audio plug 631 of an external accessory 630 through the adapter. According to an embodiment, the port 611 may include first to fourth terminals.

According to an embodiment, the adapter may include a connector 621 located at one end and an earphone connector 622 located at an opposite end. According to an embodiment, the connector 621 may be inserted into the port 611 of the electronic device. According to an embodiment, the earphone connector 622 may include first to fourth contacts. According to an embodiment, each of the plurality of contacts may contact each of a plurality of poles included in the audio plug 631 received. For example, the first contact may contact a first pole associated with a left earphone (or speaker) of the audio plug 631 and the second contact may contact a second pole associated with a right earphone of the audio plug 631. The third contact may contact a third pole associated with the ground of the audio plug 631 and the fourth contact may contact a fourth pole associated with a microphone of the audio plug 631.

According to an embodiment, the first terminal of the port 611 is connected to the first contact of the earphone connector 622 through the connector 621 and the second terminal is connected to the second contact of the earphone connector 622. The third terminal may be connected to the fourth contact of the earphone connector 622 and the fourth terminal may be connected to the fourth contact of the earphone connector 622.

According to an embodiment, a processor may control the audio circuit to measure the voltage between the third and fourth contacts. According to an embodiment, the processor may control the audio circuit to measure the impedance between at least one of the first or second contact and the third contact.

According to an embodiment, the processor may compare the measured voltage to a first threshold value and compare the measured impedance to a second threshold value to perform the operations described with reference to FIGS. 3 to 5.

Figure 7:
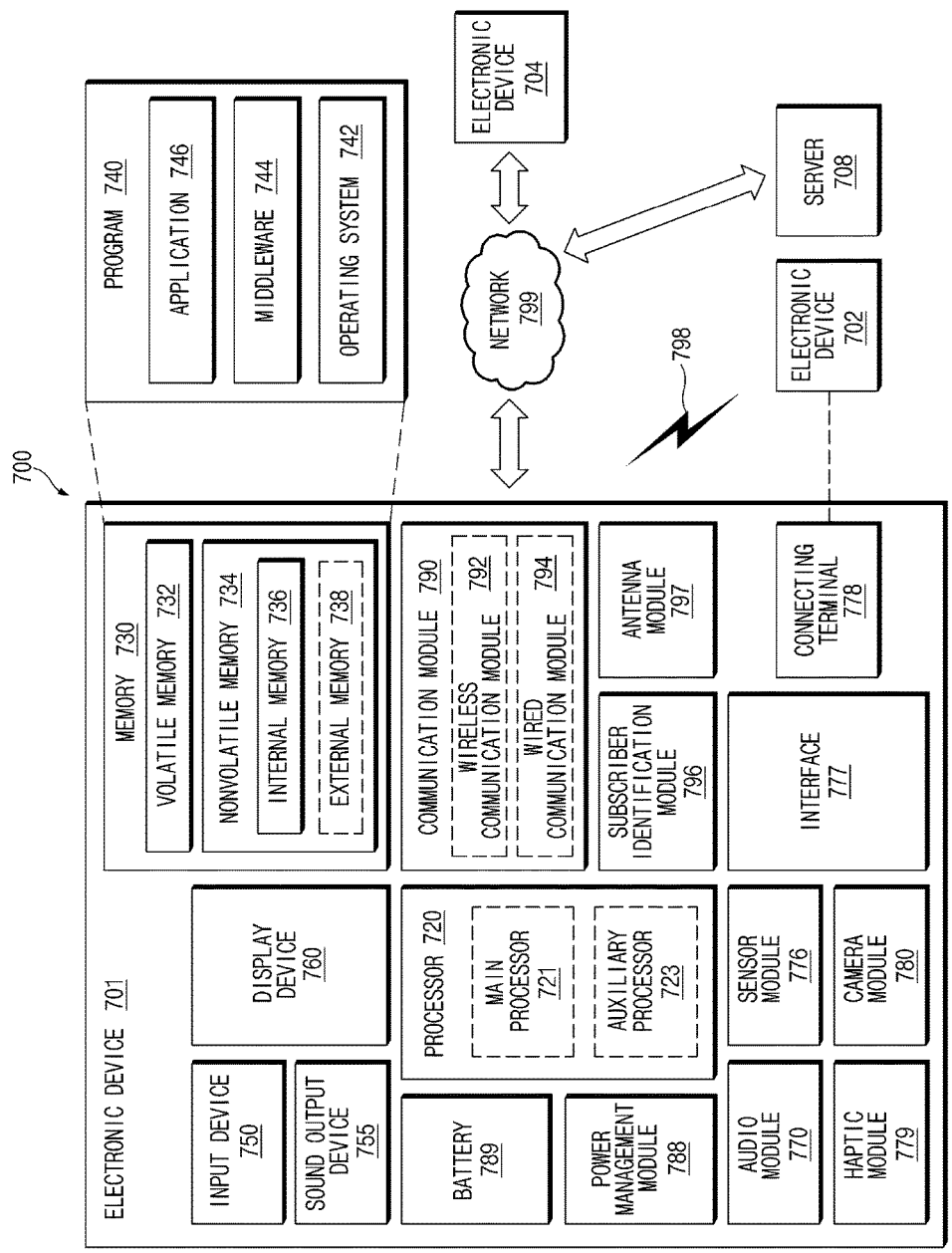
FIG. 7 is a block diagram illustrating an electronic device in a network environment according to various embodiments.

FIG. 7 is a block diagram of an electronic device in a network environment according to various embodiments.

Referring to FIG. 7, an electronic device 701 may communicate with an electronic device 702 through a first network 798 (e.g., a short-range wireless communication) or may communicate with an electronic device 704 or a server 708 through a second network 799 (e.g., a long-distance wireless communication) in a network environment 700. According to an embodiment, the electronic device 701 may communicate with the electronic device 704 through the server 708. According to an embodiment, the electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module 796, and an antenna module 797. According to some embodiments, at least one (e.g., the display device 760 or the camera module 780) among components of the electronic device 701 may be omitted or other components may be added to the electronic device 701. According to some embodiments, some components may be integrated and implemented as in the case of the sensor module 776 (e.g., a fingerprint sensor, an iris sensor, or an illuminance sensor) embedded in the display device 760 (e.g., a display).

The processor 720 may operate, for example, software (e.g., a program 740) to control at least one of other components (e.g., a hardware or software component) of the electronic device 701 connected to the processor 720 and may process and compute a variety of data. The processor 720 may load a command set or data, which is received from other components (e.g., the sensor module 776 or the communication module 790), into a volatile memory 732, may process the loaded command or data, and may store result data into a nonvolatile memory 734. According to an embodiment, the processor 720 may include a main processor 721 (e.g., a central processing unit or an application processor) and an auxiliary processor 723 (e.g., a graphic processing device, an image signal processor, a sensor hub processor, or a communication processor), which operates independently from the main processor 721, additionally or alternatively uses less power than the main processor 721, or is specified to a designated function. In this case, the auxiliary processor 723 may operate separately from the main processor 721 or embedded.

In this case, the auxiliary processor 723 may control, for example, at least some of functions or states associated with at least one component (e.g., the display device 760, the sensor module 776, or the communication module 790) among the components of the electronic device 701 instead of the main processor 721 while the main processor 721 is in an inactive (e.g., sleep) state or together with the main processor 721 while the main processor 721 is in an active (e.g., an application execution) state. According to an embodiment, the auxiliary processor 723 (e.g., the image signal processor or the communication processor) may be implemented as a part of another component (e.g., the camera module 780 or the communication module 790) that is functionally related to the auxiliary processor 723. The memory 730 may store a variety of data used by at least one component (e.g., the processor 720 or the sensor module 776) of the electronic device 701, for example, software (e.g., the program 740) and input data or output data with respect to commands associated with the software. The memory 730 may include the volatile memory 732 or the nonvolatile memory 734.

The program 740 may be stored in the memory 730 as software and may include, for example, an operating system 742, a middleware 744, or an application 746.

The input device 750 may be a device for receiving a command or data, which is used for a component (e.g., the processor 720) of the electronic device 701, from an outside (e.g., a user) of the electronic device 701 and may include, for example, a microphone, a mouse, or a keyboard.

The sound output device 755 may be a device for outputting a sound signal to the outside of the electronic device 701 and may include, for example, a speaker used for general purposes, such as multimedia play or recordings play, and a receiver used only for receiving calls. According to an embodiment, the receiver and the speaker may be either integrally or separately implemented.

The display device 760 may be a device for visually presenting information to the user of the electronic device 701 and may include, for example, a display, a hologram device, or a projector and a control circuit for controlling a corresponding device. According to an embodiment, the display device 760 may include a touch circuitry or a pressure sensor for measuring an intensity of pressure on the touch.

The audio module 770 may convert a sound and an electrical signal in dual directions. According to an embodiment, the audio module 770 may obtain the sound through the input device 750 or may output the sound through an external electronic device (e.g., the electronic device 702 (e.g., a speaker or a headphone)) wired or wirelessly connected to the sound output device 755 or the electronic device 701.

The sensor module 776 may generate an electrical signal or a data value corresponding to an operating state (e.g., power or temperature) inside or an environmental state outside the electronic device 701. The sensor module 776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 777 may support a designated protocol wired or wirelessly connected to the external electronic device (e.g., the electronic device 702). According to an embodiment, the interface 777 may include, for example, an HDMI (high-definition multimedia interface), a USB (universal serial bus) interface, a secure digital (SD) card interface, or an audio interface.

A connecting terminal 778 may include a connector that physically connects the electronic device 701 to the external electronic device (e.g., the electronic device 702), for example, an HDMI connector, a USB connector, an SD card connector, or an audio connector (e.g., a headphone connector).

The haptic module 779 may convert an electrical signal to a mechanical stimulation (e.g., vibration or movement) or an electrical stimulation perceived by the user through tactile or kinesthetic sensations. The haptic module 779 may include, for example, a motor, a piezoelectric element, or an electric stimulator.

The camera module 780 may shoot a still image or a video image. According to an embodiment, the camera module 780 may include, for example, at least one lens, an image sensor, an image signal processor, or a flash.

The power management module 788 may be a module for managing power supplied to the electronic device 701 and may serve as at least a part of a power management integrated circuit (PMIC).

The battery 789 may be a device for supplying power to at least one component of the electronic device 701 and may include, for example, a non-rechargeable (primary) battery, a rechargeable (secondary) battery, or a fuel cell.

The communication module 790 may establish a wired or wireless communication channel between the electronic device 701 and the external electronic device (e.g., the electronic device 702, the electronic device 704, or the server 708) and support communication execution through the established communication channel. The communication module 790 may include at least one communication processor operating independently from the processor 720 (e.g., the application processor) and supporting the wired communication or the wireless communication. According to an embodiment, the communication module 790 may include a wireless communication module 792 (e.g., a cellular communication module, a short-range wireless communication module, or a GNSS (global navigation satellite system) communication module) or a wired communication module 794 (e.g., an LAN (local area network) communication module or a power line communication module) and may communicate with the external electronic device using a corresponding communication module among them through the first network 798 (e.g., the short-range communication network such as a Bluetooth, a WiFi direct, or an IrDA (infrared data association)) or the second network 799 (e.g., the long-distance wireless communication network such as a cellular network, an internet, or a computer network (e.g., LAN or WAN)). The above-mentioned various communication modules 790 may be implemented into one chip or into separate chips, respectively.

According to an embodiment, the wireless communication module 792 may identify and authenticate the electronic device 701 using user information stored in the sub scriber identification module 796 in the communication network.

The antenna module 797 may include one or more antennas to transmit or receive the signal or power to or from an external source. According to an embodiment, the communication module 790 (e.g., the wireless communication module 792) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 701 and the external electronic device 704 through the server 708 connected to the second network 799. Each of the electronic devices 702 and 704 may be the same or different types as or from the electronic device 701. According to an embodiment, all or some of the operations performed by the electronic device 701 may be performed by another electronic device or a plurality of external electronic devices. When the electronic device 701 performs some functions or services automatically or by request, the electronic device 701 may request the external electronic device to perform at least some of the functions related to the functions or services, in addition to or instead of performing the functions or services by itself. The external electronic device receiving the request may carry out the requested function or the additional function and transmit the result to the electronic device 701. The electronic device 701 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 740) including an instruction stored in a machine-readable storage media (e.g., an internal memory 736 or an external memory 738) readable by a machine (e.g., a computer). The machine may be a device that calls the instruction from the machine-readable storage media and operates depending on the called instruction and may include the electronic device (e.g., the electronic device 701). When the instruction is executed by the processor (e.g., the processor 720), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:
1. An electronic device comprising:
at least one microphone;
an earphone connector configured to connect with an audio plug, the earphone connector including a first contact and a second contact associated with a sound output through the audio plug, a third contact connected to a ground, and a fourth contact associated with a sound input through the audio plug;
an audio circuit connected to the earphone connector;
a processor connected to the at least one microphone and the audio circuit; and
a memory connected to the processor,
wherein the memory stores instructions when executed, cause the processor to:
apply a bias voltage to the fourth contact through the audio circuit;
measure a voltage between the third and fourth contacts through the audio circuit;

measure an impedance between the third contact and at least one of the first contact or second contact through the audio circuit;

activate the at least one microphone when the measured voltage is greater than or equal to a first threshold value and the measured impedance is less than or equal to a second threshold value; and deactivate the at least one microphone when the measured voltage is greater than or equal to the first threshold value and the measured impedance exceeds the second threshold value.

2. The electronic device of claim 1, wherein the instructions, when executed, further cause the processor to obtain a sound using the at least one microphone that is activated when the measured voltage is greater than or equal to the first threshold value and the measured impedance is less than or equal to the second threshold value.

3. The electronic device of claim 1, wherein the instructions, when executed, further cause the processor to perform, when the audio plug is connected with the earphone connector, at least one of the applying of the bias voltage, the measuring of the voltage, or the measuring of the impedance.

4. The electronic device of claim 1, wherein the memory further stores a specified sensitivity of the at least one microphone, and wherein the instructions, when executed, further cause the processor to change the specified sensitivity of the at least one microphone to a value in a specified range when the measured voltage is greater than or equal to the first threshold value and the measured impedance is less than or equal to the second threshold value.

5. The electronic device of claim 1, wherein the at least one microphone includes a plurality of microphones, and wherein the instructions, when executed, further cause the processor to obtain a sound through at least one microphone that is previously specified among the plurality of microphones when the measured voltage is greater than or equal to the first threshold value and the measured impedance is less than or equal to the second threshold value.

6. The electronic device of claim 1, further comprising:
a display electrically connected to the processor,
wherein the instructions, when executed, further cause the processor to display, on the display, information associated with obtaining of a sound through the at least one microphone when the measured voltage is greater than or equal to the first threshold value and the measured impedance is less than or equal to the second threshold value.

7. The electronic device of claim 1, wherein the instructions, when executed, further cause the processor to perform a first operation specified when a first event, in which the measured voltage is changed to a first voltage that is previously specified, occurs in a state where the measured voltage is less than the first threshold value or the measured impedance exceeds the second threshold value, and perform a second operation specified when a second event, in which the measured voltage is changed to a second voltage that is previously specified, occurs in a state where the measured voltage is greater than or equal to the first threshold value or the measured impedance is less than or equal to the second threshold value.

8. The electronic device of claim 7, further comprising:
a camera connected to the processor, wherein the second operation includes an operation of obtaining an image using the camera.

9. The electronic device of claim 7, wherein the instructions, when executed, further cause the processor to:
perform a third operation when the first event occurs a specified number of times within a specified range of time, and perform a fourth operation when the second event occurs the specified number of times within the specified range of time.

10. The electronic device of claim 9, wherein the memory stores a camera application, and wherein the fourth operation includes an operation of executing the camera application.

11. A method of operating an electronic device that includes an earphone connector including a first contact and a second contact associated with a sound output through an audio plug, a third contact connected to a ground, and a fourth contact associated with a sound input, and a microphone, the method comprising:

applying a bias voltage to the fourth contact;

measuring a voltage between the third and fourth contacts;

measuring an impedance between at least one of the first or second contact and the third contact;

activating the microphone when the measured voltage is greater than or equal to a first threshold value and the measured impedance is less than or equal to a second threshold value; and deactivating the microphone when the measured voltage is greater than or equal to the first threshold value and the measured impedance exceeds the second threshold value.

12. The method of claim 11, wherein the applying of the bias voltage includes applying the bias voltage to the fourth contact when the audio plug is received in the earphone connector.

13. The method of claim 11, further comprising:
displaying, on a display, information associated with obtaining of a sound through the microphone when the measured voltage is greater than or equal to the first threshold value and the measured impedance is less than or equal to the second threshold value.

14. The method of claim 11, further comprising:
performing a first operation specified when a first event, in which the measured voltage is changed to a first voltage that is previously specified, occurs in a state where the measured voltage is less than the first threshold value or the measured impedance exceeds the second threshold value; and performing a second operation different from the first operation when a second event, in which the measured voltage is changed to a second voltage that is previously specified, occurs in a state where the measured voltage is greater than or equal to the first threshold value or the measured impedance is less than or equal to the second threshold value.

15. The method of claim 14, further comprising:
performing a third operation when the first event occurs a specified number of times within a specified range of time; and performing a fourth operation when the second event occurs the specified number of times within the specified range of time.

16. An electronic device comprising:
at least one microphone;

a port connected with an adaptor including a connector and an earphone connector, wherein the port includes a first terminal connected to a first contact of the earphone connector through the connector, a second terminal connected to a second contact of the earphone connector, a third terminal connected to a third contact of the earphone connector, and a fourth terminal connected to a fourth contact of the earphone connector;

an audio circuit connected to the port;

a processor connected to the at least one microphone and the audio circuit; and a memory connected to the processor, wherein the memory stores instructions when executed, cause the processor to:

apply a bias voltage to the fourth terminal through the audio circuit;

measure a voltage between the third and fourth terminals through the audio circuit;

measure an impedance between at least one of the first terminal or second terminal and the third terminal through the audio circuit;

obtain a sound through the at least one microphone when the measured voltage is greater than or equal to a first threshold value and the measured impedance is less than or equal to a second threshold value; and deactivate the at least one microphone when the measured voltage is greater than or equal to the first threshold value and the measured impedance exceeds the second threshold value.

17. The electronic device of claim 16, wherein the instructions, when executed, further cause the processor to perform at least one of the applying of the bias voltage, the measuring of the voltage, or the measuring of the impedance when an audio plug is received in the earphone connector.

18. The electronic device of claim 16, further comprising:
a display electrically connected to the processor,
wherein the instructions, when executed, further cause the processor to display, on the display, a message representing that a sound is obtained through the at least one microphone when the measured voltage is greater than or equal to the first threshold value and the measured impedance is less than or equal to the second threshold value.

19. The electronic device of claim 16, wherein the instructions, when executed, further cause the processor to:

perform a first operation when a first event, in which the measured voltage is changed to a first voltage previously specified, occurs in a state where the measured voltage is less than the first threshold value or the measured impedance exceeds the second threshold value; and perform a second operation when a second event, in which the measured voltage is changed to a second voltage previously specified, occurs in a state where the measured voltage is greater than or equal to the first threshold value and the measured impedance is less than or equal to the second threshold value.

20. The electronic device of claim 19, wherein the instructions, when executed by the processor, cause the processor to:

perform a third operation when the first event occurs a specified number of times within a specified range of time; and perform a fourth operation when the second event occurs the specified number of times within the specified range of time.

* * * * *